United States Patent
Wang

(10) Patent No.: US 10,971,098 B2
(45) Date of Patent: Apr. 6, 2021

(54) METHOD AND DEVICE FOR ADJUSTING GRAY SCALE OF DISPLAY PANEL

(71) Applicants: HKC CORPORATION LIMITED, Guangdong (CN); CHONGQING HKC OPTOELECTRONICS TECHNOLOGY CO., LTD., Chongqing (CN)

(72) Inventor: Mingliang Wang, Chongqing (CN)

(73) Assignees: HKC CORPOR ATION LIMITED, Guangdong (CN); CHONGQING HKC OPTOELECTRONICS CO., LTD, Chongqing (CN)

(*) Notice: Subject to any disclaimer, the term of this patent is extended or adjusted under 35 U.S.C. 154(b) by 0 days.

(21) Appl. No.: 16/625,103

(22) PCT Filed: Jun. 22, 2018

(86) PCT No.: PCT/CN2018/092367
§ 371 (c)(1),
(2) Date: Dec. 20, 2019

(87) PCT Pub. No.: WO2019/001354
PCT Pub. Date: Jan. 3, 2019

(65) Prior Publication Data
US 2020/0184912 A1 Jun. 11, 2020

(30) Foreign Application Priority Data
Jun. 26, 2017 (CN) .......................... 201710497582.2

(51) Int. Cl.
*G09G 3/36* (2006.01)
*G09G 3/00* (2006.01)
(Continued)

(52) U.S. Cl.
CPC .......... *G09G 3/3648* (2013.01); *G09G 3/006* (2013.01); *G09G 3/2803* (2013.01); *G09G 3/36* (2013.01);
(Continued)

(58) Field of Classification Search
CPC ................. G09G 2320/0233; G09G 2320/043
See application file for complete search history.

(56) References Cited

U.S. PATENT DOCUMENTS

2009/0195483 A1* 8/2009 Naugler, Jr. ......... G09G 3/3233
345/76
2015/0187303 A1* 7/2015 Choi ........................ G09G 3/20
345/691
(Continued)

FOREIGN PATENT DOCUMENTS

| CN | 105185286 A | 12/2015 |
|---|---|---|
| CN | 105304024 A | 2/2016 |

(Continued)

OTHER PUBLICATIONS

International Search Report, dated Sep. 28, 2018, for HKC Corporation Limited et al., International Application No. PCT/CN2018/092367, Filed Jun. 22, 2018.

(Continued)

*Primary Examiner* — Sepehr Azari
(74) *Attorney, Agent, or Firm* — Law Offices of Albert Wai-Kit Chan. PLLC

(57) ABSTRACT

The present disclosure discloses a method and a device for adjusting gray scale of a display panel, the method comprises: performing image acquisition on a display panel, and obtaining a current image; identifying an nonuniform block in the current image, and detecting an original output brightness and an original input gray scale of the nonuniform block; determining a target input gray scale corre-
(Continued)

sponding to a preset target brightness according to an actual Gamma curve value, the actual Gamma curve value is obtained through testing the display panel; using a difference value between the original input gray scale and the target input gray scale as a gray scale compensation value of the nonuniform block.

20 Claims, 7 Drawing Sheets

(51) Int. Cl.
 *G09G 3/28* (2013.01)
 *H04N 1/407* (2006.01)
 *G09G 5/10* (2006.01)
(52) U.S. Cl.
 CPC ......... *G09G 3/3607* (2013.01); *G09G 3/3611* (2013.01); *G09G 5/10* (2013.01); *H04N 1/4078* (2013.01); *G09G 2310/027* (2013.01); *G09G 2320/029* (2013.01); *G09G 2320/0233* (2013.01); *G09G 2320/0626* (2013.01); *G09G 2320/0673* (2013.01); *G09G 2330/12* (2013.01); *G09G 2360/16* (2013.01)

(56) References Cited

U.S. PATENT DOCUMENTS

2016/0225344 A1　8/2016　Joo et al.
2018/0040295 A1*　2/2018　Deng .................... G09G 5/10

FOREIGN PATENT DOCUMENTS

| CN | 106782283 A | 5/2017 |
| CN | 107045863 A | 8/2017 |

OTHER PUBLICATIONS

Office Action, dated Oct. 16, 2017, for HKC Corporation Limited et al., Chinese Patent Application No. 201710497582.2, filed Jun. 26, 2017.
Written Opinion, dated Sep. 28, 2018, for HKC Corporation Limited et al., International Application No. PCT/CN2018/092367, Filed Jun. 22, 2018.

* cited by examiner

METHOD AND DEVICE FOR ADJUSTING GRAY SCALE OF DISPLAY PANEL

FIELD

The present disclosure relates to the field of liquid crystal panel display technologies, in particular, to a method and a device for adjusting gray scale of a display panel.

BACKGROUND OF THE DISCLOSURE

Due to complex production process and large control difficulty, a liquid crystal panel tends to appear nonuniform phenomenon of nonuniform brightness display (also called mura phenomenon) during the production process, that is, a block-shaped mark phenomenon of a certain region of the panel caused by a difference of display brightness, which reduces the quality grade of the panel. In recent years, with the popularization of a television such as 2K and 4K, the nonuniform phenomenon is increasingly serious. To solve the nonuniform phenomenon, a technology of eliminating the nonuniform (also called a Demura technology) is born at the right moment, and the technology of eliminating the nonuniform belongs to an external compensation technology. At present, the technology is mainly used for lightening a backboard, and brightness signals are extracted through a charge-coupled device (CCD) optical camera. nonuniform display images are detected, and the central region of the panel is taken as a reference. Through comparing a difference between the brightness of other regions of the panel and that of the central region and according to the standard Gamma 2.2 curve (currently, the Gamma value of most of the displays is 2.2) to calculate display data needed to be compensated, the brightness uniformity of the whole panel is achieved.

At present, the technology of eliminating the nonuniform has the advantages of being simple in structure and flexible in manner, and therefore the technology is widely adopted at the present stage; but a premise of calculating compensation data is that the panel already has a standard Gamma 2.2 curve. However, the Gamma curve of each piece is not likely to be precisely controlled in the actual production process of the panel, so that nonuniform gray scale compensation value is not accurate enough, and a final effect of the Demura eliminating nonuniform is easily affected.

The above content is only used for assisting understanding of the technical solutions of the present disclosure, and is not meant to be an admission that the above-mentioned contents are prior art.

SUMMARY

The present disclosure aims to provide a method and a device for adjusting gray scale of a display panel, and aims to solve the problem that recently, in the process of manufacturing a liquid crystal display panel, due to the fact that a nonuniform mura compensation value is not accurate enough, the final effect of eliminating the nonuniform is undesirable.

In order to realize the above aim, the present disclosure provides a method for adjusting gray scale of a display panel, the method comprises the following steps:

performing image acquisition on a display panel, and obtaining a current image;

identifying an nonuniform block in the current image, and detecting an original output brightness and an original input gray scale of the nonuniform block;

determining a target input gray scale corresponding to a preset target brightness according to an actual Gamma curve value, the actual Gamma curve value is obtained through testing the display panel;

using a difference value between the original input gray scale and the target input gray scale as a gray scale compensation value of the nonuniform block;

testing an actual current value of a sub-pixel at an $i^{th}$ gray scale on the display panel, wherein i=0, 1, 2, . . . , n−1, and n is a gray scale grade value;

adjusting the actual current value of the sub-pixel at the $i^{th}$ gray scale to be a preset target current value of the sub-pixel at the $i^{th}$ gray scale, and recording a target gray scale value when the sub-pixel is with a target current value corresponding to the $i^{th}$ gray scale;

performing current compensation on at least one sub-pixel to be compensated of the display panel, according to a data distribution table of target gray scale values of each said sub-pixel at each target current value.

Optionally, before the step of determining a target input gray scale corresponding to a preset target brightness according to an actual Gamma curve value, the method further comprises:

obtaining n reference images of the display panel at different input gray scales, wherein n is an integer larger than or equal to 2;

calculating reference Gamma curve values of each of the reference images;

using an average value of the reference Gamma curve values as an actual Gamma curve value.

Optionally, the n is an integer greater than or equal to 5.

Optionally, the step of calculating reference Gamma curve values of each of the reference images further comprises:

detecting a reference input gray scale and a reference output brightness of each reference image;

calculating a reference Gamma curve value of each reference image according to the reference input gray scale, the reference output brightness and a Gamma mathematical model; and the Gamma mathematical model represents the corresponding relation between the reference input gray scale and the reference output brightness.

Optionally, the Gamma mathematical model is:

$$\frac{Tx - To}{T255 - To} = \left(\frac{Lx}{255}\right)^{Gamma}$$

wherein Tx is the reference output brightness, and T255 is a corresponding output brightness when an input gray scale is 255, To is a corresponding output brightness when an input gray scale is 0, Lx is the reference input gray scale, and Gamma is the actual Gamma curve value.

Optionally, before the step of determining a target input gray scale corresponding to a preset target brightness according to an actual Gamma curve value, the method further comprises:

obtaining an output brightness of a center point of the current image;

using the output brightness of the center point of the current image as the preset target brightness.

Optionally, before the step of determining a target input gray scale corresponding to a preset target brightness according to an actual Gamma curve value, the method further comprises:

obtaining an output brightness of each pixel point at other regions except nonuniform regions in the current image;

using an average value of the obtained output brightness as the preset target brightness.

Optionally, after the step of using a difference value between the original input gray scale and the target input gray scale as a gray scale compensation value of the nonuniform block, the method further comprises:

transmitting a gray scale compensation value to the display panel, so that the display panel uses a result obtained after the gray scale compensation value adding the original input gray scale of the nonuniform block as a new input gray scale of the nonuniform block, so as to eliminate the nonuniform block in the current image.

Optionally, the method further comprises: burning the gray scale compensation value into a memory so as to achieve a compensation effect of the current image.

Optionally, the display panel is a liquid crystal display panel.

Optionally, the liquid crystal display panel is applied to a computer display screen, a television display screen and a tablet computer display screen.

Optionally, the gray scale grade value n is n=2M, wherein M is a positive integer larger than or equal to 3.

Optionally, the step of testing an actual current value of a sub-pixel at an $i^{th}$ gray scale on the display panel comprises:

setting the gray scale of the sub-pixel on the display panel as 0, and testing to obtain a first output current value;

adjusting the gray scale of the sub-pixel on the display panel to be i, and testing to obtain a second output current value;

subtracting the first output current value from the second output current value to obtain the actual current value of the sub-pixel at the $i^{th}$ gray scale.

Optionally, the step of performing current compensation on at least one sub-pixel to be compensated of the display panel, according to a data distribution table of target gray scale values of each said sub-pixel at each target current value, wherein a specific process is as follows:

for any sub-pixel to be compensated of the display panel, according to the data distribution table, adjusting a $j^{th}$ gray scale of the sub-pixel to a target gray scale value corresponding to a target current value of said sub-pixel at the $j^{th}$ gray scale, wherein j=1, 2, . . . , n−1.

In order to realize the above aim, the present disclosure also provides a device for adjusting gray scale of a display panel, the device comprising:

an image acquisition module, configured to perform image acquisition on a display panel, and obtain a current image;

an identification module, configured to identify an nonuniform block in the current image, and detect an original output brightness and an original input gray scale of the nonuniform block;

a calculation module, configured to determine a target input gray scale corresponding to a preset target brightness according to an actual Gamma curve value, the actual Gamma curve value is obtained through testing the display panel;

an adjusting module, configured to use a difference value between the original input gray scale and the target input gray scale as a gray scale compensation value of the nonuniform block;

a current testing module, configured to test an actual current value of a sub-pixel at an $i^{th}$ gray scale on the display panel, wherein i=0, 1, 2, . . . , n−1, and n is a gray scale grade value;

a current adjusting module, configured to adjust the actual current value of the sub-pixel at the $i^{th}$ gray scale to be a preset target current value of the sub-pixel at the $i^{th}$ gray scale, and record a target gray scale value when the sub-pixel is with a target current value corresponding to the $i^{th}$ gray scale;

a current compensation module, configured to perform current compensation on at least one sub-pixel to be compensated of the display panel, according to a data distribution table of target gray scale values of each said sub-pixel at each target current value.

Optionally, the image acquisition module is an optical CCD camera.

Optionally, the gray scale grade value n is n=2M, wherein M is a positive integer larger than or equal to 3.

Optionally, the current testing module comprises:

a setting gray scale unit, configured to set the gray scale of the sub-pixel on the display panel as 0, and test to obtain a first output current value;

an adjusting gray scale unit, configured to adjust the gray scale of the sub-pixel on the display panel to be i, and test to obtain a second output current value;

a testing actual current unit, configured to subtract the first output current value from the second output current value to obtain the actual current value of the sub-pixel at the $i^{th}$ gray scale.

Optionally, the current compensation module comprises:

an adjusting target gray scale unit, configured to for any sub-pixel to be compensated of the display panel, according to the data distribution table, adjust a $j^{th}$ gray scale of the sub-pixel to a target gray scale value corresponding to a target current value of said sub-pixel at the $j^{th}$ gray scale, wherein j=1, 2, . . . , n−1.

In addition, in order to realize the above aim, the present disclosure also provides a display device, wherein comprises a display panel; and a device for adjusting gray scale of a display panel as mentioned above.

The method for adjusting gray scale of a display panel according to the present disclosure, which can be in the process of manufacturing each piece of liquid crystal panel, gray scale value compensation is performed on the nonuniform region of the display panel, according to the actual Gamma curve and the preset target brightness, so that the most accurate compensation effect is achieved, and the nonuniform in the display panel can be accurately and effectively eliminated. It solves the problem that recently, in the process of manufacturing a liquid crystal display panel, due to the fact that a mura nonuniform compensation value is not accurate enough, the final effect of eliminating the nonuniform is undesirable. Meanwhile, through adjusting the actual current value obtained through testing of the sub-pixel at the $i^{th}$ gray scale to be a preset target current value of the sub-pixel at the $i_{th}$ gray scale, and recording a target gray scale value when the sub-pixel is with a target current value corresponding to the $i^{th}$ gray scale, and according to the target gray scale value distribution which is obtained when each sub-pixel is respectively with each target current value corresponding to n different gray scales, a data distribution table of the display panel is formed. Current compensation is performed on any other sub-pixel of the display panel according to the data distribution table. Therefore, the current of the whole display panel is uniformly distributed. Comparing with existing technical solutions, no special compensation circuit needs to be added, and the compensation effect is desirable. The compensation process is simple, and during long time operation, no new display nonuniform can be caused due to current distribution nonuniform.

The realizing of the aim, functional characteristics, advantages of the present disclosure are further described in detail with reference to the accompanying drawings and the embodiments.

DETAILED DESCRIPTION OF THE EMBODIMENTS

It should be understood that the specific embodiments described herein are merely used to explain the present disclosure and are not intended to limit the present disclosure.

Figure 1:
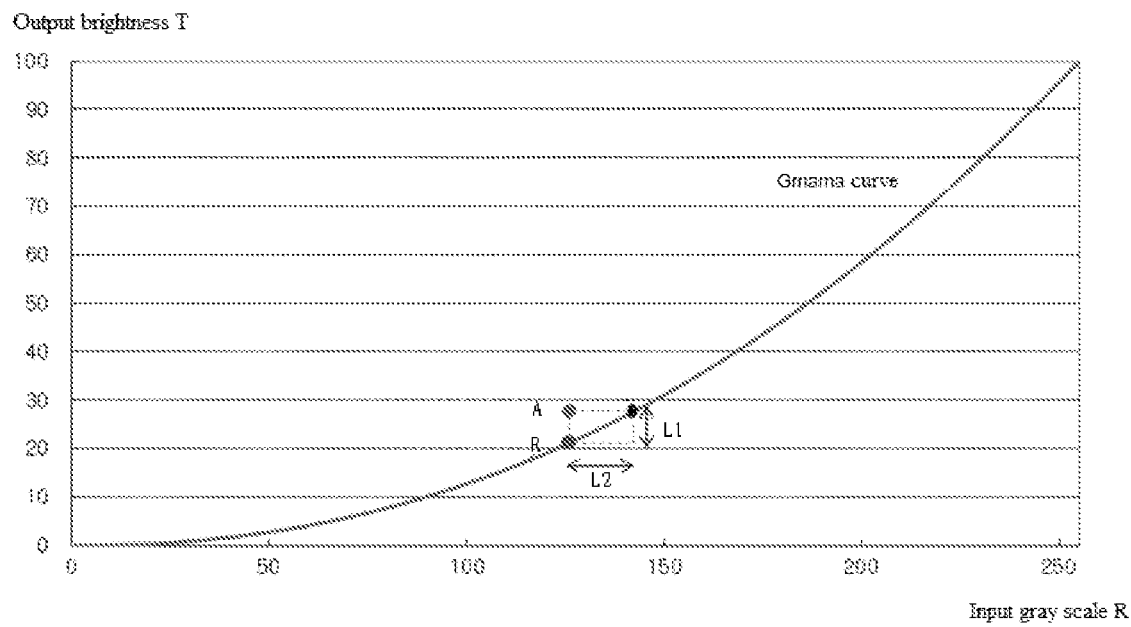
FIG. 1 is a schematic diagram of a conventional acquisition method of a gray scale compensation value of a display panel.

Currently, the technology of eliminating the nonuniform (also called Demura technology) has the advantages of being simple in structure and flexible in manner, and therefore the technology is widely adopted at the present stage; but a premise of calculating compensation data is that the panel already has a standard Gamma 2.2 curve. However, the Gamma curve of each piece is not likely to be precisely controlled in the actual production process of the panel, so that a final effect of the Demura technology is easily affected. As shown in FIG. 1, the a principle of calculating compensation data of a currently common Demura technology. The Gamma curve shown in FIG. 1, a horizontal coordinate of which is an input gray scale R (i.e. an objective physical quantity of an object)), and a vertical coordinate of which is output brightness T (i.e. a subjective brightness of human eyes). In order to facilitate calculation at the present stage, the Gamma curve is assumed to be 2.2 in an unified manner. And the point A in the drawing represents a target brightness, and the point R represents an actual brightness of the nonuniform region. In order to increase the brightness of the nonuniform region to the target brightness of the display panel (i.e., an effect that a compensation brightness L1 can be obtained as in the drawing is finally achieved), a compensation gray scale L2 of corresponding horizontal coordinate is needed to be obtained on a curve of Gamma 2.2. The disadvantage of this process is that if the actual Gamma curve of the panel is not 2.2, a deviation can be resulted form the compensation effect, and the phenomenon of mura nonuniform cannot be improved to a serious extent.

Figure 2:
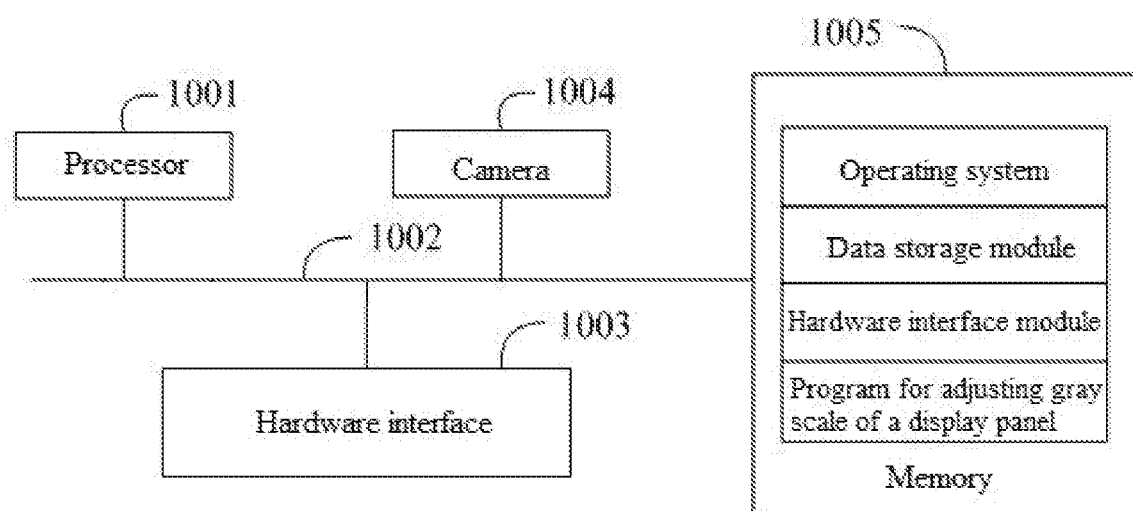
FIG. 2 is a schematic structure diagram of a device for adjusting gray scale of a display panel of a hardware running environment according to an embodiment of the present disclosure.

Referring to FIG. 2, FIG. 2 is a schematic structure diagram of a device for adjusting gray scale of a display panel of a hardware running environment according to an embodiment of the present disclosure.

As shown in FIG. 2, the device may include a processor 1001, such as CUP, a communication bus 1002, a hardware interface 1003, a camera 1004 and a memory 1005. Wherein the communication bus 1002 is configured to realize connection communication between these components. The hardware interface 1003 may include a liquid crystal display panel. The camera 1004 can be selected as a high-precision high-resolution optical CCD camera, the CCD camera can achieve the resolution of human eyes. The memory 1005 may be a high-speed RAM memory, or a non-volatile memory, and also include an electrically erasable programmable read-only memory.

It will be understood by those skilled in the art that the device structure shown in FIG. 2 is not intended to limit the device, wherein More or fewer components can be included, or some components can be combined, or different components can be arranged.

As shown in FIG. 2, the memory 1005 serves as a computer storage medium, including an operating system, a data storage module, a hardware interface module and a program for adjusting gray scale of a display panel.

In the device shown in FIG. 2, the camera 1004 is configured to perform image acquisition on the display panel; the hardware interface 1003 is mainly configured to carry out data interaction with the display panel; the processor 1001 and the memory 1005, which is in the device of the present disclosure, can be arranged in the device. The device calls the program for adjusting gray scale of the display panel stored in the memory 1005 through the processor 1001, and executes the following operations:

performing image acquisition on a display panel, and obtaining a current image;

identifying an nonuniform block in the current image, and detecting an original output brightness and an original input gray scale of the nonuniform block;

determining a target input gray scale corresponding to a preset target brightness according to an actual Gamma curve value, and the actual Gamma curve value is obtained through testing the display panel;

using a difference value between the original input gray scale and the target input gray scale as a gray scale compensation value of the nonuniform block;

testing an actual current value of a sub-pixel at an $i^{th}$ gray scale on the display panel, wherein i=0, 1, 2, . . . , n−1, and n is a gray scale grade value;

adjusting the actual current value of the sub-pixel at the $i^{th}$ gray scale to be a preset target current value of the sub-pixel at the $i^{th}$ gray scale, and recording a target gray scale value when the sub-pixel is with a target current value corresponding to the $i^{th}$ gray scale;

performing current compensation on at least one sub-pixel to be compensated of the display panel, according to a data distribution table of target gray scale values of each said sub-pixel at each target current value.

Further, the processor 1001 may call the program for adjusting gray scale of the display panel stored in the memory 1005, and further execute the following operations:

obtaining n reference images of the display panel at different input gray scales, wherein n is an integer larger than or equal to 2;

calculating reference Gamma curve values of each of the reference images;

using an average value of the reference Gamma curve values as an actual Gamma curve value.

Further, the processor 1001 may call the program for adjusting gray scale of the display panel stored in the memory 1005, and further execute the following operations:

detecting a reference input gray scale and a reference output brightness of each reference image;

calculating a reference Gamma curve value of each reference image according to the reference input gray scale, the reference output brightness and a Gamma mathematical model; and the Gamma mathematical model represents the corresponding relation between the reference input gray scale and the reference output brightness;

Further, the processor 1001 can call the program for adjusting gray scale of the display panel stored in the memory 1005, and further execute the following operations:

obtaining an output brightness of a center point of the current image, and using the output brightness of the center point of the current image as the preset target brightness.

Further, the processor 1001 may call the program for adjusting gray scale of the display panel stored in the memory 1005, and further execute the following operations:

obtaining an output brightness of each pixel point at other regions except nonuniform regions in the current image;

using an average value of the obtained output brightness as the preset target brightness.

Further, the processor 1001 can call the program for adjusting gray scale of the display panel stored in the memory 1005, and further execute the following operations:

transmitting a gray scale compensation value to the display panel, so that the display panel uses a result obtained after the gray scale compensation value adding the original input gray scale of the nonuniform block as a new input gray scale of the nonuniform block, so as to eliminate the nonuniform block in the current image.

Further, the processor 1001 may call the program for adjusting gray scale of the display panel stored in the memory 1005, and further execute the following operations:

setting the gray scale of the sub-pixel on the display panel as 0, and testing to obtain a first output current value;

adjusting the gray scale of the sub-pixel on the display panel to be i, and testing to obtain a second output current value;

subtracting the first output current value from the second output current value to obtain the actual current value of the sub-pixel at the $i^{th}$ gray scale.

Further, the processor 1001 can call the program for adjusting gray scale of the display panel stored in the memory 1005, and further execute the following operations:

for any sub-pixel to be compensated of the display panel, according to the data distribution table, adjusting a $j^{th}$ gray scale of the sub-pixel to a target gray scale value corresponding to a target current value of said sub-pixel at the $j^{th}$ gray scale, wherein j=1, 2, . . . , n−1.

According to an embodiment of the present disclosure, image acquisition is performed on a display panel, and a current image is obtained; an nonuniform block is identified in the current image, and an original output brightness and an original input gray scale of the nonuniform block is detected; a target input gray scale corresponding to a preset target brightness is determined according to an actual Gamma curve value, and the actual Gamma curve value is obtained through testing the display panel; a difference value between the original input gray scale and the target input gray scale is used as a gray scale compensation value of the nonuniform block; an actual current value of a sub-pixel at an $i^{th}$ gray scale on the display panel is tested, wherein i=0, 1, 2, . . . , n−1, and n is a gray scale grade value; the actual current value of the sub-pixel at the $i^{th}$ gray scale is adjusted to be a preset target current value of the sub-pixel at the $i^{th}$ gray scale, and a target gray scale value is recorded when the sub-pixel is with a target current value corresponding to the $i^{th}$ gray scale; current compensation is performed on at least one sub-pixel to be compensated of the display panel, according to a data distribution table of target gray scale values of each said sub-pixel at each target current value. According to the technical solution of the embodiment of the present disclosure, the problem is solved that recently, in the process of manufacturing a liquid crystal display panel, due to the fact that a nonuniform mura compensation value is not accurate enough, the final effect of eliminating the nonuniform is undesirable. Meanwhile, through adjusting the actual current value obtained through testing of the sub-pixel at the $i^{th}$ gray scale to be a preset target current value of the sub-pixel at the $i^{th}$ gray scale, and recording a target gray scale value when the sub-pixel is with a target current value corresponding to the $i^{th}$ gray scale, and according to the target gray scale value distribution which is obtained when each sub-pixel is respectively with each target current value corresponding to n different gray scales, a data distribution table of the display panel is formed. Current compensation is performed on any other sub-pixel of the display panel according to the data distribution table. Therefore, the current of the whole display panel is uniformly distributed. Comparing with existing technical solutions, no special compensation circuit needs to be added, and the compensation effect is desirable. The compensation process is simple, and during long time operation, no new display nonuniform can be caused due to current distribution nonuniform.

On the basis of the hardware structure, a method for adjusting gray scale of the display panel according to an embodiment of the present disclosure is provided.

Figure 3:
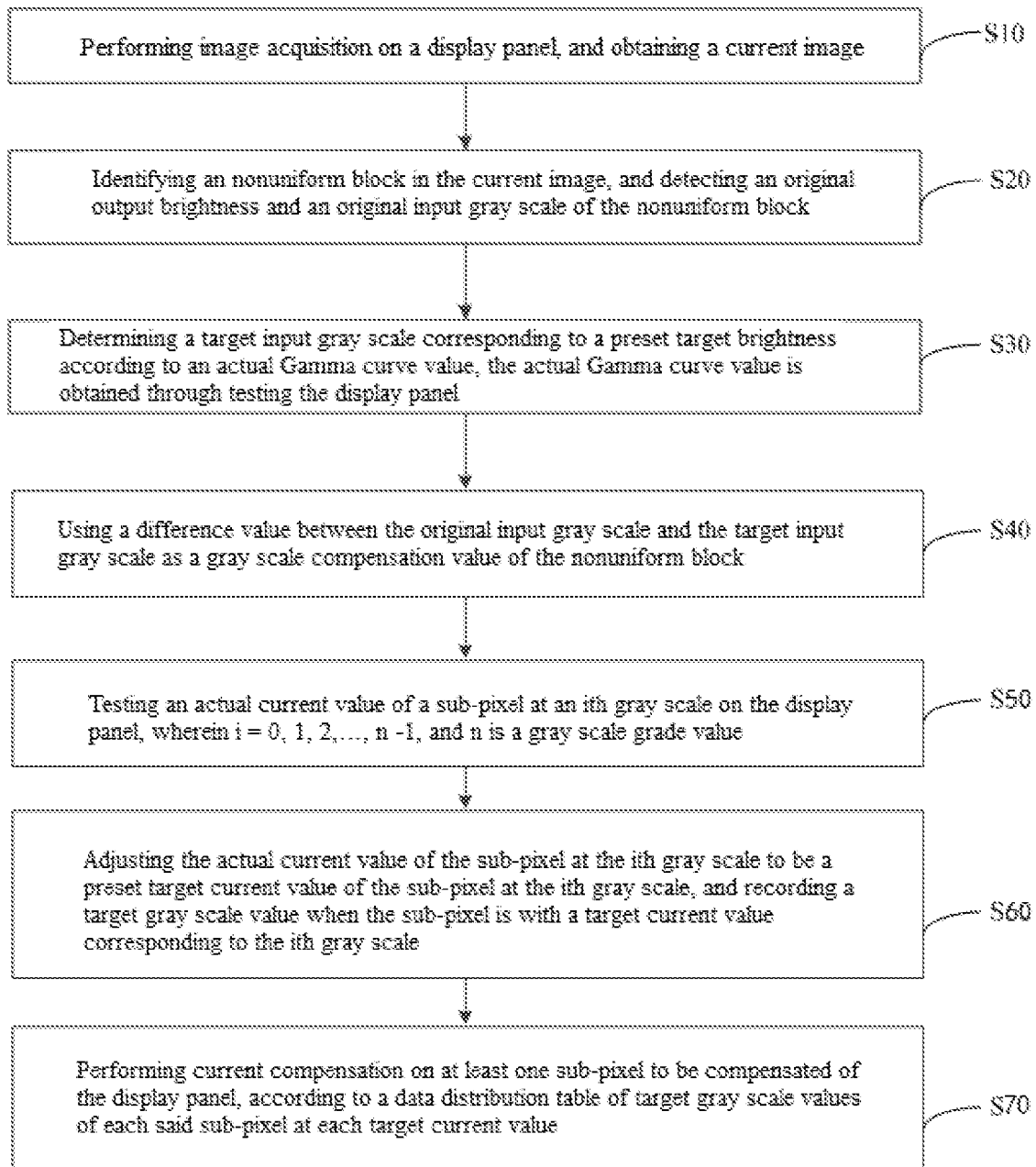
FIG. 3 is a schematic flow diagram of a method for adjusting gray scale of a display panel according to a first embodiment of the present disclosure.

Referring to FIG. 3, FIG. 3 is a schematic flow diagram of a method for adjusting gray scale of a display panel according to a first embodiment of the present disclosure.

In the embodiment, the method includes the following steps,

S10, performing image acquisition on a display panel, and obtaining a current image.

It is understood that the current image mentioned above is the current display image of the display panel.

In a specific implementation, after the display panel is turned on, a current display picture (i.e. a current image) is shot through an optical CCD camera.

It should be noted that the display panel in the embodiment can be a liquid crystal display panel, and the liquid crystal display panel can be applied to display devices such as a computer display screen, a television display screen, a tablet computer display screen and the like.

S20, identifying an nonuniform block in the current image, and detecting an original output brightness and an original input gray scale of the nonuniform block.

It is understood that during the process of producing the display panel, nonuniform phenomenon may occur in the current display image displayed by the display panel (i.e, a nonuniform block possibly exists); when image acquisition is performed on the display panel, brightness signals of the nonuniform block in the current image are extracted.

It is noted that the brightness signal includes an input gray scale and an output brightness; the input gray scale is a gray scale capable of being recognized by a display, and the gray scale represents an actual objective brightness, that is, an objective natural physical quantity of the object. Moreover, the display may continuously acquire different input voltages (also called Gamma voltages), and different input voltages reflects different gray scales. The output brightness is the subjective brightness felt by human eyes, due to the fact that human perception to the stimulation of nature world is non-linear, if the outside world enhances stimulation on human by a certain proportion, for human the stimulation is increased uniformly. Similarly, human eyes perception to natural brightness is also non-linear, so that the subjective brightness perceived by the human eyes and the actual objective brightness are not completely the same, and the Gamma curve is used for coordinating a mapping relation between the subjective brightness perception of the human eyes and the actual objective natural brightness, that is, to coordinate the mapping relation between the output brightness and the input gray scale, a formula of an output value=an input value$^{Gamma}$ reflects a relation between the two items.

It can be understood that the output brightness value (i.e, subjective brightness perception of human eyes) of the original image displayed is known; the gray scale value (i.e., the input gray scale) of the original image displayed it is also known, that only what displayed by the display screen at this gray scale is not uniform i, that is, the nonuniform is generated; when nonuniform blocks are detected, some of the nonuniform is obvious seen by the human eyes, and some of the nonuniform is not obvious enough seen by human eyes; professional equipment is used to detect and identify the nonuniform blocks in the current image, that is, the pixel distribution characteristics are analyzed according to the obtained display data in the current image, and the nonuniform is identified according to related algorithms; a plurality of related algorithms can be used in the nonuniform detection process, which is not limited in the embodiment herein.

S30, determining a target input gray scale corresponding to a preset target brightness according to an actual Gamma curve value, the actual Gamma curve value is obtained through testing the display panel.

It should be noted that in the embodiment, there will be a uniform brightness display region in the current image, the output brightness value of the display region is used as a preset target brightness value.

In a specific implementation, an output brightness of a center point of the current image can be obtained, and the output brightness of the center point of the panel is used as the preset target brightness, that is, the output brightness of the panel central region of the current image is obtained, and through taking the panel central region as a reference, comparing the differences between the brightness of other regions with that of the central region of the panel. Usually, in the process of actually producing the display panel, the center point of the display panel is the place with the best optical taste, and therefore debugging is performed on the center point of the panel when the panel is debugged;

Optionally, through obtaining an output brightness of each pixel point at other regions except nonuniform regions in the current image; and calculating an average value of the output brightness of the pixel, so as to use the average value of the output brightness as the preset target brightness.

S40: using a difference value between the original input gray scale and the target input gray scale as a gray scale compensation value of the nonuniform block.

Figure 4:
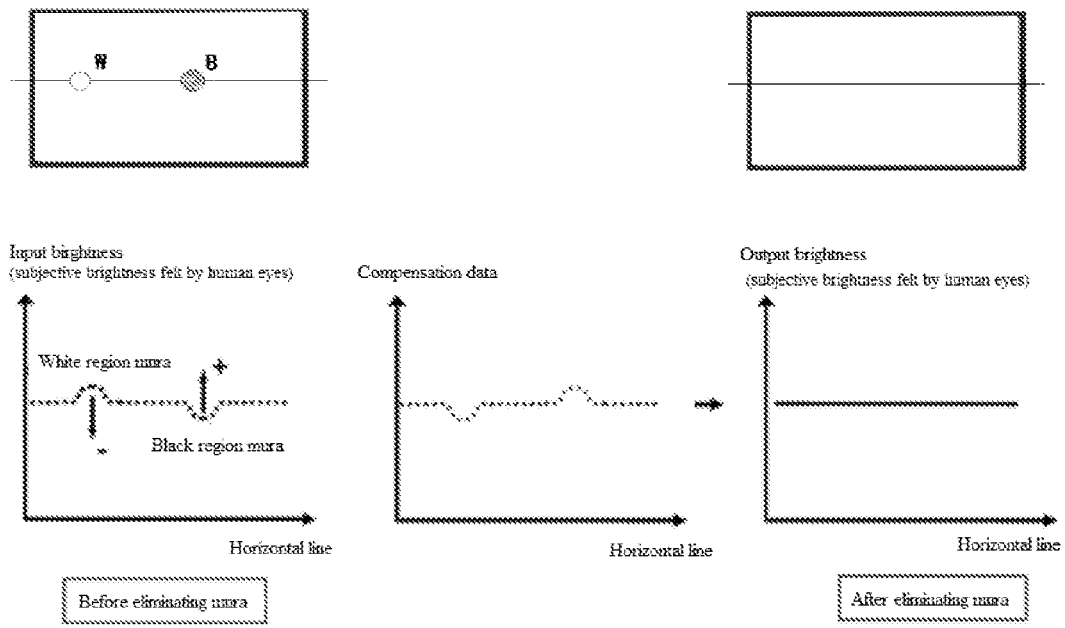
FIG. 4 is a schematic principle diagram of eliminating nonuniform regions of a display panel according to an embodiment of the present disclosure.

It can be understood that referring to FIG. 4, it is assumed that in the horizontal direction of the image on the left side picture, there are one the white nonuniform block W and one black nonuniform block B, in the S40, a difference value between the original (input) gray scale value and the target gray scale value is used as a compensation data (i.e, the gray scale compensation value) of the nonuniform block to perform data compensation on the two regions, that is, the display data of the region is the addition of the original display data and the compensation data, a nonuniform compensation data of the white block is a negative number, that is, the display data can be reduced, and the nonuniform data corresponding to the black block can be correspondingly increased, so that uniform brightness can be achieved finally, and nonuniform elimination can be realized.

Figure 5:
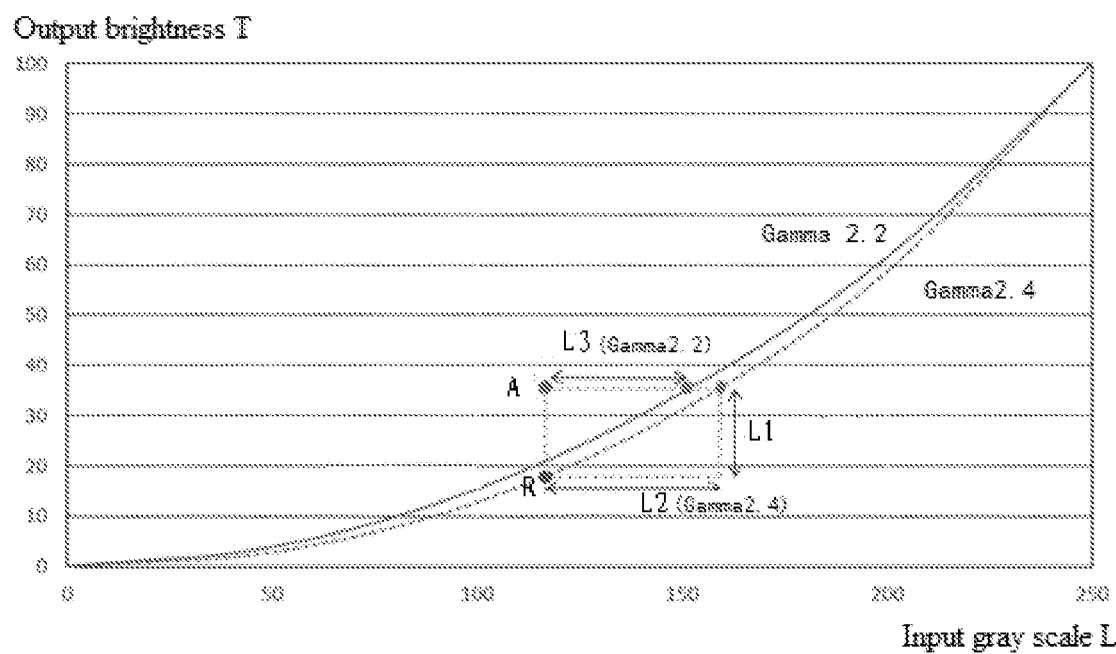
FIG. 5 is a schematic principle diagram of performing data compensation on nonuniform regions of a display panel according to an embodiment of the present disclosure.

In a specific implementation, referring to FIG. 5, it is assumed that the tested actual Gamma curve value of the panel is 2.4. Dotted line is a Gamma 2.4 curve, and the solid line is a Gamma 2.2 curve. It can be seen that when compensating the same brightness difference L1; the compensation gray scale value L3 obtained under the Gamma 2.2 curve is different form the compensation gray scale value L2 obtained under the Gamma 2.4 curve. The compensation gray scale value L3 under the Gamma 2.2 curve is smaller than the compensation gray scale value L2 under the actual Gamma 2.4 curve, so that only the compensation is suitable to the characteristics of the panel is optimal.

After S40, the obtained gray scale compensation value can be burned on an electrically erasable programmable read-only memory (EEPROM) to achieve a compensation effect of the current image, that is the gray scale compensation value is transmitted to the display panel, so that the display panel uses a result obtained after the gray scale compensation value adding the original input gray scale of the nonuniform block as a new input gray scale of the nonuniform block, so as to eliminate the nonuniform block in the current image (mura phenomenon).

According to the embodiment, during the production wherein Manufacturing process of each piece of liquid crystal panel, gray scale value compensation is performed on the nonuniform region of the display panel, according to the actual Gamma curve and the preset target brightness, so that the most accurate compensation effect is achieved, and the nonuniform (mura) in the display panel can be accurately and effectively eliminated.

S50: testing an actual current value of a sub-pixel at an i$^{th}$ gray scale on the display panel, wherein i=0, 1, 2, . . . , n−1, and n is a gray scale grade value.

As mentioned above, the sub-pixel is any sub-pixel on the display panel. The testing process is as follows: adjusting the gray scale value of the sub-pixel to be i=0, and the actual current value of the sub-pixel at the 0 gray scale is obtained through testing; the gray scale value of the sub-pixel is adjusted again to be i=1, and the actual current value of the sub-pixel at the i$^{th}$ gray scale is obtained through testing; and so on, various actual current values of the sub-pixel at n different gray scales can be obtained through testing. One skilled in the art can understand that the sequence of testing the actual current values of the sub-pixel at different gray scales can be adjusted by them.

It should be noted that optional gray scale grade value is n, and n=2M, wherein M is a positive integer larger than or equal to 3. One skilled in the art can understand that a normal gray scale grade value n is 256.

In the above operation, various actual current values of one sub-pixel at n different gray scales on the display panel are obtained, according to the operations mentioned above, testing each sub-pixel on the display panel, so that various actual current values of each sub-pixel at n different gray scales on the display panel can be obtained.

S60: adjusting the actual current value of the sub-pixel at the $i^{th}$ gray scale to be a preset target current value of the sub-pixel at the $i^{th}$ gray scale, and recording a target gray scale value when the sub-pixel is with a target current value corresponding to the $i^{th}$ gray scale.

As mentioned above, the sub-pixels of the display panel are R, G and B respectively, the target current values of all R sub-pixels on the display panel at the same gray scale are the same, therefore, according to the characteristics of the display panel, and a target current value corresponding to the R sub-pixels on the display panel at each gray scale is preset, and similarly, setting a target current value corresponding to the G sub-pixels at each gray scale. It should be noted that in the same gray scale, the target current values corresponding to the R sub-pixels, the G sub-pixels and the B sub-pixels can be different. The target current value of all R sub-pixels at the second gray scale is 83 µA, the target current value of all G sub-pixels is 79 µA, the target current value of all the B sub-pixels is 86 µA. In the operation mentioned above, the sub-pixel refer to one R sub-pixel or one G sub-pixel or one B sub-pixel.

The actual current value and the target current value of the sub-pixel at the $i^{th}$ gray scale are known, and the actual current value of the sub-pixel at the $i^{th}$ gray scale is adjusted to be the corresponding target current value. At the moment, the gray scale value of the sub-pixel can be changed along with the change of the current value, and recording a target gray scale value when the sub-pixel is adjusted to a target current value corresponding to the $i^{th}$ gray scale. By parity of reasoning, the target gray scale value distribution is recorded when the sub-pixel is with the target current values corresponding to the n different gray scales.

In the above operations, the target gray scale value distribution has been obtained when one sub-pixel is with various target current values corresponding to the n different gray scales on the display panel. According to the above operations, the target gray scale value distribution is recorded when each sub-pixel is with various target current values corresponding to the n different gray scales.

S70: performing current compensation on at least one sub-pixel to be compensated of the display panel, according to a data distribution table of target gray scale values of each said sub-pixel at each target current value.

As mentioned above, target gray scale value distribution, that each sub-pixel with various target current values corresponding to n different gray scales, is formed a data distribution table of the display panel. The data distribution table can be split into R sub-pixel data distribution table, G sub-pixel data distribution table and the b sub-pixel data distribution table according to the sub-pixels R, G and B. According to the R sub-pixel data distribution table, the current compensation can be carried out on any R sub-pixel of any other display panel in the same type as the display panel mentioned above. Alternatively, according to the data distribution table, the current compensation can be carried out on any sub-pixel of any display panel in the same type as the display panel mentioned above.

Figure 9:
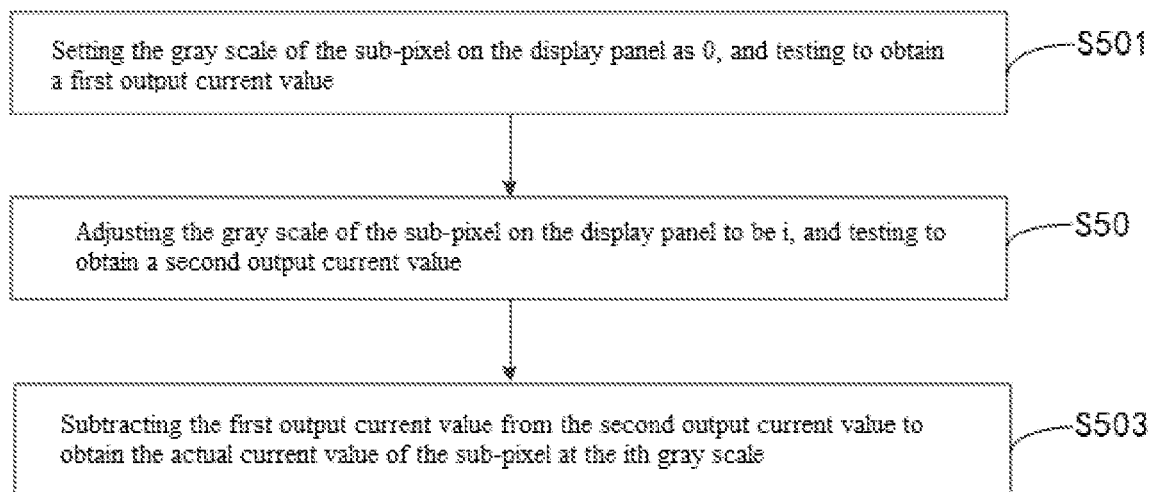
FIG. 9 is a further schematic flow diagram of a method for adjusting gray scale of a display panel according to the present disclosure.

Exemplarily, on the basis of the above technical solution, as shown in FIG. 9, S50 of testing an actual current value of a sub-pixel at an $i^{th}$ gray scale on the display panel can be realized by the following steps:

S501, setting the gray scale of the sub-pixel on the display panel as 0, and testing to obtain a first output current value.

As mentioned above, for testing the actual current value of the sub-pixel on the display panel, firstly, the sub-pixel data of the display panel needs to be obtained, including the current gray scale value of each sub-pixel. The gray scale of the sub-pixel to be tested is set to be 0, and the gray scale values of other sub-pixels are kept unchanged. The current value of the display panel is tested, and the current value is the first output current value.

S502, adjusting the gray scale of the sub-pixel on the display panel to be i, and testing to obtain a second output current value.

As described above, after the first output current value is obtained, the gray scale value of the sub-pixel to be tested is adjusted from 0 to i, and the gray scale values of other sub-pixels are kept unchanged. The current value of the display panel is tested, and the current value is the second output current value.

S503: subtracting the first output current value from the second output current value to obtain the actual current value of the sub-pixel at the $i^{th}$ gray scale.

As described above, it is known that the gray scale value of other sub-pixels remains unchanged, and the gray scale value of the sub-pixel to be tested is changed. The gray scale of the sub-pixel of the display panel is controlled by the current, so that the current values of other sub-pixels is not changed, and the current value of the sub-pixel to be tested is changed, so that factor affecting the output current value is only the sub-pixel to be tested. It is known that the second output current value is the current value of the display panel when the gray scale value of the sub-pixel to be tested is i, and the first output current value is the current value of the display panel when the gray scale value of the sub-pixel to be tested is 0, a difference value of subtracting the first output current value from the second output current value is the actual current value of the sub-pixel to be tested at the $i^{th}$ gray scale.

In this way, the actual current values of each sub-pixel of the display panel at n different gray scales can be tested and obtained.

Persons skilled in the art can understand that the actual current value of the sub-pixel at the $i^{th}$ gray scale can be obtained in other manners. For example, the gray scale of all sub-pixels on the display panel is set to be 0 and tested to obtain a first output current value, adjusting the gray scale of the sub-pixel to be tested to be i and testing to obtain a second output current value, and the difference value between the second output current value and the first output current value is the actual current value of the sub-pixel to be tested at the $i^{th}$ gray scale.

Exemplarily, on the basis of the technical solution mentioned above, S70 of performing current compensation on at least one sub-pixel to be compensated of the display panel, according to a data distribution table of target gray scale values of each said sub-pixel at each target current value can be achieved through the following steps:

S71: for any sub-pixel to be compensated of the display panel, according to the data distribution table, adjusting a jth gray scale of the sub-pixel to a target gray scale value corresponding to a target current value of said sub-pixel at the jth gray scale, wherein j=1, 2, . . . , n−1.

As mentioned above, distribution conditions of the target gray scale values of each sub-pixel with each target current value on the display panel forms the data distribution table of the display panel, and the current compensation can be carried out on any other display panel which is in the same type as the display panel mentioned above. Taking compensation of the whole display panel as an example, each gray scale of each sub-pixel of the display panel needs to be compensated. For example, if setting each sub-pixel to be compensated of the display panel to 0 gray scale, the target gray scale value of each sub-pixel at the 0 gray scale is searched for in the data distribution table, and adjusting the 0 gray scale of each sub-pixel to be compensated of the display panel to a corresponding target gray scale value, and then performing target gray scale value adjustment on the sub-pixel at the first gray scale, and so on, so as to compensate the whole display panel.

The target gray scale value of any one of the sub-pixels corresponds to the target current value, so that after the initial gray scale of the sub-pixel is adjusted to be the target gray scale value, the current value of the sub-pixel is adjusted to be the target current value along with the adjustment of the target gray scale value, so that the current compensation of the sub-pixel is realized.

Figure 6:
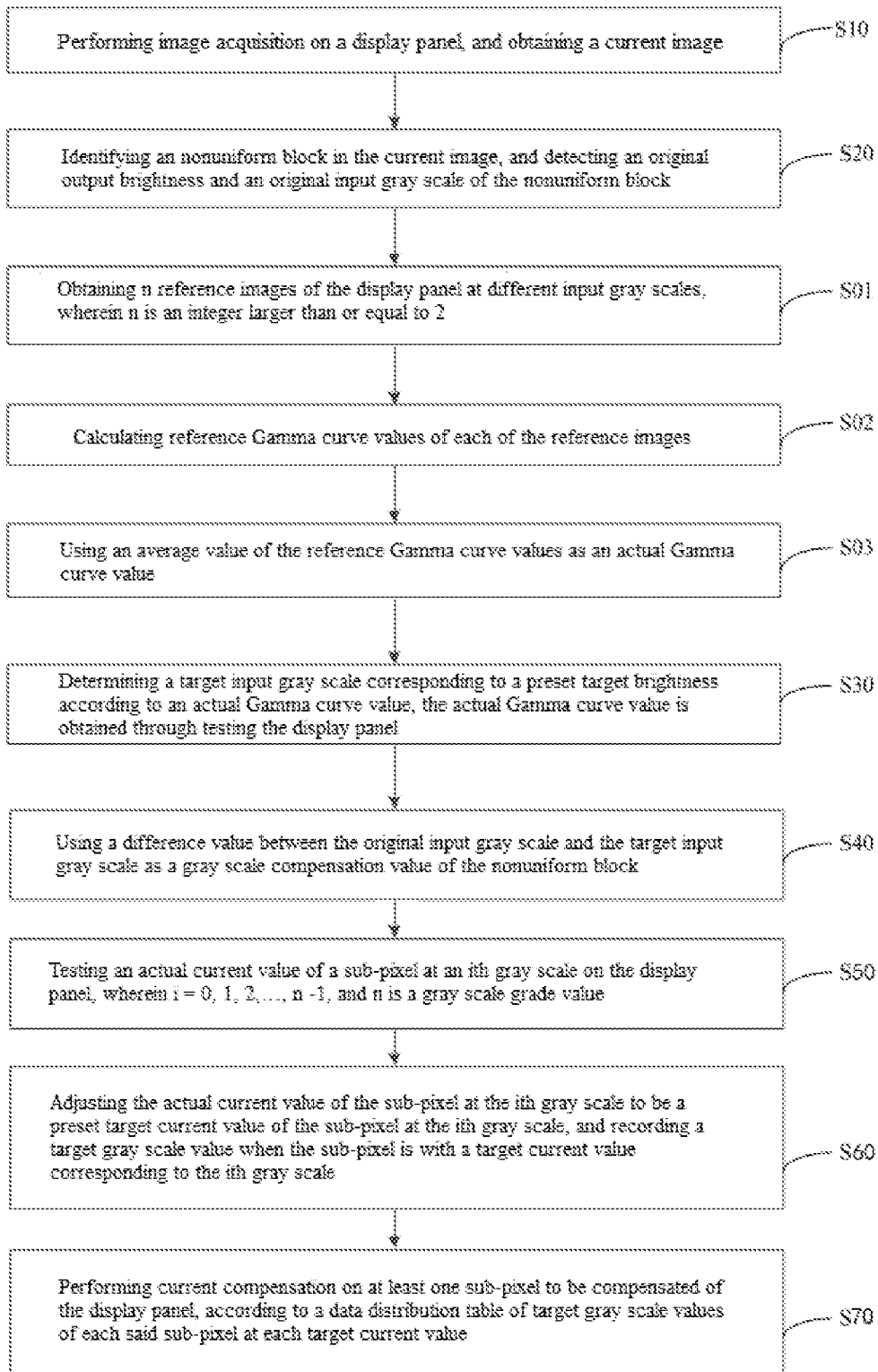
FIG. 6 is a schematic flow diagram of a method for adjusting gray scale of a display panel according to a second embodiment of the present disclosure.

Referring to FIG. 6, a second embodiment of a method for adjusting gray scale of a display panel is disclosed, based on the first embodiment of the method, FIG. 6 is based on the embodiment shown in FIG. 3.

In the embodiment, before the S30 of determining a target input gray scale corresponding to a preset target brightness according to an actual Gamma curve value, the method further includes the following steps:

S01: obtaining n reference images of the display panel at different input gray scales, wherein n is an integer larger than or equal to 2.

In a specific implementation, after a driving circuit turns on the display panel, the initial display condition (i.e., the current image) of the current display panel can be shot through the high-precision resolution CCD camera. Meanwhile, the CCD camera can additionally shoot image information of the display condition of the current display panel at different gray scale values. These image information of different gray scale values is used as a reference image, nonuniform regions in the reference images and nonuniform regions of an initial display condition (i.e, the current image) are completely identical.

Depending on actual needs, the original CCD camera can be used for shooting additional 5 or more reference images; and by taking five reference images as an example, the five images are obtained by taking five gray scale values of the image in the front-eye display panel: the first one taking 0 gray scale, and the fifth one taking 255 gray scale, and three images in the middle taking three different gray scale values, 5 images is obtained when shooting. In addition, increasing the number of shot images will cause excessive workload and difficulty, the method is simple and feasible.

S02: calculating reference Gamma curve values of each of the reference images.

In this embodiment, detection can be carried out on the three reference images in the middle mentioned above to extract a corresponding reference input gray scale value and a reference output brightness; and then calculating reference Gamma curve values of each reference image, according to reference input gray scale value, the reference output brightness and the Gamma mathematical model. The Gamma mathematical model represents the corresponding relation between the reference input gray scale value and the reference output brightness.

It is understood that there is a non-linear mapping relation (that is, a Gamma curve can reflect the mapping relation between them and the mapping relation can also be referred to as a Gamma mathematical model) between the input gray scale value (i.e., it can represent the Gamma voltage, that is, an objective physical quantity of an object recognized by the computer) and the output brightness value (i.e., the subjective brightness felt by the human eyes) of each reference image. The non-linear mapping relation is commonly represented using a default formula: the output brightness=the input gray scale $^{Gamma}$. Known from above, the input gray scale value of each reference image is known; meanwhile, due to the fact that the reference image is obtained through the CCD camera, the output brightness value of each reference image can be measured. The output brightness value is also known, therefore the Gamma value of each reference image can be obtained through the formula: the output brightness=the input gray scale $^{Gamma}$ wherein the Gamma values of each reference image are not necessarily the same, and a certain deviation exists between them.

In a specific implementation, the Gamma mathematical model is:

$$\frac{Tx - To}{T255 - To} = \left(\frac{Lx}{255}\right)^{Gamma}$$

wherein Tx is the reference output brightness, and T255 is a corresponding output brightness when an input gray scale is 255, To is a corresponding output brightness when an input gray scale is 0, Lx is the reference input gray scale, and Gamma is the actual Gamma curve value.

The embodiment introduces the Gamma mathematical model, so that the numerical value of the Gamma curve of each reference image obtained through calculation is closer to the numerical value of the actual Gamma curve of the current display panel. The Gamma curve value of each reference image is calculated through the formula, and the deviation between the calculated result and the actual Gamma curve value of the display panel can be further reduced.

S03: using an average value of the reference Gamma curve values as an actual Gamma curve value.

It is understood that, known from the above, and an deviation exists between the Gamma curve values obtained through calculation of each reference image, so that through calculating the Gamma curve corresponding to the average value of the Gamma curve values, a Gamma curve closest to the actual condition of the panel can be obtained. the Gamma curve is used as an actual Gamma curve, and then using the actual Gamma curve as a reference to find a compensation value which is actually needed by each nonuniform region in the current image of the display panel, so that the most accurate compensation can be achieved.

According to the embodiment, the actual Gamma curve of the display panel is measured in advance, i.e., the images of the display panel at different gray scales are shot, and the reference Gamma curve values of the display panel at different gray scales are detected by combining the Gamma mathematical model. The average value of the reference Gamma curve values is used as the actual Gamma curve value closest to the actual condition of the display panel, the actual Gamma curve of the display panel can be effectively obtained in the process of producing the display panel, so that the gray scale compensation value of the nonuniform region can be obtained more accurately.

Figure 7:
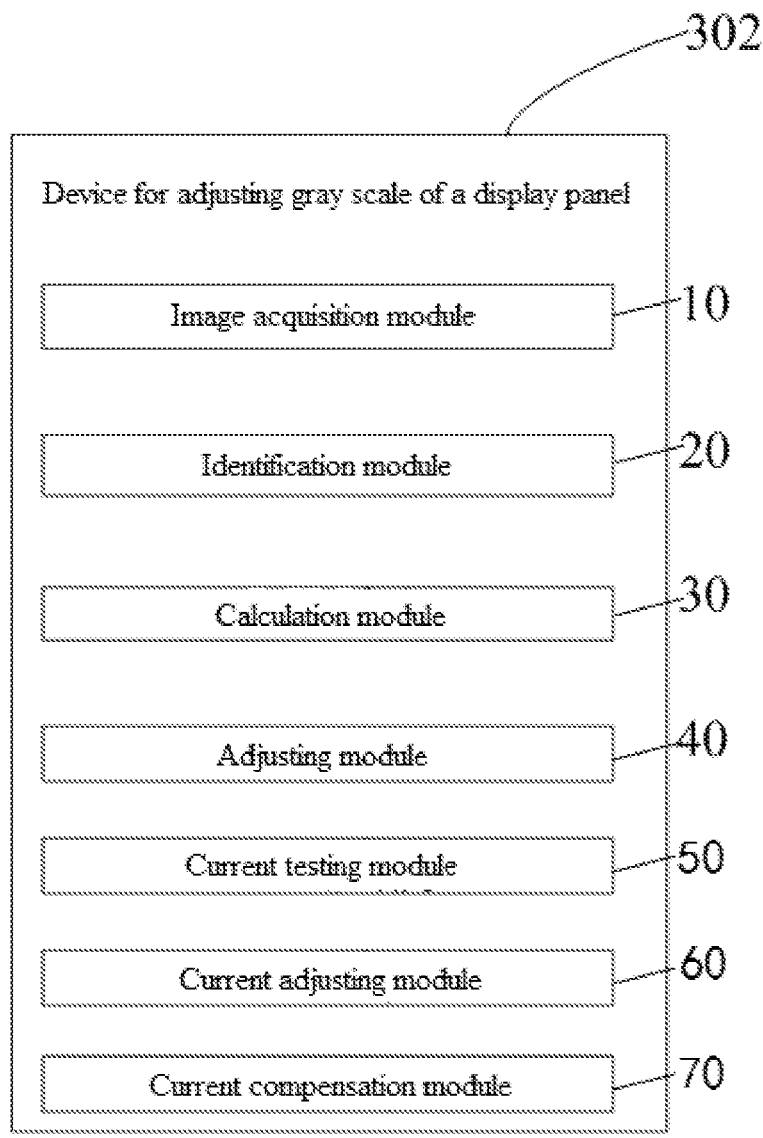
FIG. 7 is a schematic block diagram of a device for adjusting a gray scale of a display panel according to an embodiment of the present disclosure.

Referring to FIG. 7, a schematic block diagram of a device for adjusting gray scale of a display panel is provided according to an embodiment of the present disclosure, wherein the device 302 for adjusting gray scale of the display panel includes:

an image acquisition module 10, configured to perform image acquisition on a display panel, and obtain a current image.

It is understood that the current image mentioned above is the current display image of the display panel.

In a specific implementation, after the display panel is turned on, a current display picture (i.e. a current image) is shot through an optical CCD camera.

It should be noted that the display panel in the embodiment can be a liquid crystal display panel, and the liquid crystal display panel can be applied to display devices such as a computer display screen, a television display screen, a tablet computer display screen and the like.

an identification module 20, configured to identify an nonuniform block in the current image, and detect an original output brightness and an original input gray scale of the nonuniform block.

It is understood that during the process of producing the display panel, nonuniform phenomenon may occur in the current display image displayed by the display panel (i.e, a nonuniform block possibly exists); when image acquisition is performed on the display panel, brightness signals of the nonuniform block in the current image are extracted.

It is noted that the brightness signal includes an input gray scale and an output brightness; the input gray scale is a gray scale capable of being recognized by a display, and the gray scale represents an actual objective brightness, that is, an objective natural physical quantity of the object. Moreover, the display may continuously acquire different input voltages (also called Gamma voltages), and different input voltages reflects different gray scales. The output brightness is the subjective brightness felt by human eyes, due to the fact that human perception to the stimulation of nature world is non-linear, if the outside world enhances stimulation on human by a certain proportion, for human the stimulation is increased uniformly. Similarly, human eyes perception to natural brightness is also non-linear, so that the subjective brightness perceived by the human eyes and the actual objective brightness are not completely the same, and the Gamma curve is used for coordinating a mapping relation between the subjective brightness perception of the human eyes and the actual objective natural brightness, that is, to coordinate the mapping relation between the output brightness and the input gray scale, a formula of an output value=an input value $^{Gamma}$ reflects a relation between the two items.

It can be understood that the output brightness value (i.e, subjective brightness perception of human eyes) of the original image displayed is known; the gray scale value (i.e., the input gray scale) of the original image displayed it is also known, that only what displayed by the display screen at this gray scale is not uniform i, that is, the nonuniform is generated; when nonuniform blocks are detected, some of the nonuniform is obvious seen by the human eyes, and some of the nonuniform is not obvious enough seen by human eyes; professional equipment is used to detect and identify the nonuniform blocks in the current image, that is, the pixel distribution characteristics are analyzed according to the obtained display data in the current image, and the nonuniform is identified according to related algorithms; a plurality of related algorithms can be used in the nonuniform detection process, which is not limited in the embodiment herein.

a calculation module 30, configured to determine a target input gray scale corresponding to a preset target brightness according to an actual Gamma curve value, the actual Gamma curve value is obtained through testing the display panel.

It should be noted that in the embodiment, there will be a uniform brightness display region in the current image, the output brightness value of the display region is used as a preset target brightness value.

In a specific implementation, an output brightness of a center point of the current image can be obtained, and the output brightness of the center point of the panel is used as the preset target brightness, that is, the output brightness of the panel central region of the current image is obtained, and through taking the panel central region as a reference, comparing the differences between the brightness of other regions with that of the central region of the panel. Usually, in the process of actually producing the display panel, the center point of the display panel is the place with the best optical taste, and therefore debugging is performed on the center point of the panel when the panel is debugged;

Optionally, through obtaining an output brightness of each pixel point at other regions except nonuniform regions in the current image; and calculating an average value of the output brightness of the pixel, so as to use the average value of the output brightness as the preset target brightness.

an adjusting module 40, configured to use a difference value between the original input gray scale and the target input gray scale as a gray scale compensation value of the nonuniform block.

It can be understood that referring to FIG. 4, it is assumed that in the horizontal direction of the image on the left side picture, there are one the white nonuniform block W and one black nonuniform block B, the adjusting module 40 uses a difference value between the original (input) gray scale value and the target gray scale value as a compensation data (i.e, the gray scale compensation value) of the nonuniform block to perform data compensation on the two regions, that is, the display data of the region is the addition of the original display data and the compensation data, a nonuniform compensation data of the white block is a negative number, that is, the display data can be reduced, and the nonuniform data corresponding to the black block can be correspondingly increased, so that uniform brightness can be achieved finally, and nonuniform elimination can be realized.

In a specific implementation, referring to FIG. 5, it is assumed that the tested actual Gamma curve value of the panel is 2.4. Dotted line is a Gamma 2.4 curve, and the solid line is a Gamma 2.2 curve. It can be seen that when compensating the same brightness difference L1; the compensation gray scale value L3 obtained under the Gamma 2.2 curve is different form the compensation gray scale value L2 obtained under the Gamma 2.4 curve. The compensation gray scale value L3 under the Gamma 2.2 curve is smaller than the compensation gray scale value L2 under the actual Gamma 2.4 curve, so that only the compensation is suitable to the characteristics of the panel is optimal. Finally, the obtained gray scale compensation value is burned on an electrically erasable programmable read-only memory (EEPROM) to achieve a compensation effect of the current image, that is the gray scale compensation value is transmitted to the display panel, so that the display panel uses a result obtained after the gray scale compensation value adding the original input gray scale of the nonuniform block as a new input gray scale of the nonuniform block, so as to eliminate the nonuniform block in the current image (mura phenomenon).

a current testing module 50, configured to test an actual current value of a sub-pixel on the display panel at an $i^{th}$ gray scale, wherein i=0, 1, 2, ..., n-1, and n is a gray scale grade value.

a current adjusting module 60, configured to adjust the actual current value of the sub-pixel at the $i^{th}$ gray scale to be a preset target current value of the sub-pixel at the $i^{th}$ gray scale, and record a target gray scale value when the sub-pixel is with a target current value corresponding to the $i^{th}$ gray scale.

a current compensation module 70, configured to perform current compensation on at least one sub-pixel to be compensated of the display panel, according to a data distribution table of target gray scale values of each said sub-pixel at each target current value.

Optionally, the gray scale grade value n is n=2M, wherein M is a positive integer larger than or equal to 3.

Optionally, the current testing module 50 includes a setting gray scale unit 51, an adjusting gray scale unit 52 and a testing actual current unit 53.

The setting gray scale unit 51, configured to set the gray scale of the sub-pixel on the display panel as 0, and test to obtain a first output current value; and the adjusting gray scale unit 52, configured to adjust the gray scale of the sub-pixel on the display panel to be i, and test to obtain a second output current value; the testing actual current unit 53, configured to subtract the first output current value from the second output current value to obtain the actual current value of the sub-pixel at the $i^{th}$ gray scale.

Optionally, the current compensation module 70 includes an adjusting target gray scale unit 71.

Wherein the adjusting target gray scale unit 71, configured to for any sub-pixel to be compensated of the display panel, according to the data distribution table, adjust a $j^{th}$ gray scale of the sub-pixel to a target gray scale value corresponding to a target current value of said sub-pixel at the $j^{th}$ gray scale, wherein j=1, 2, ..., n-1.

According to the pixel current compensation system of the display panel provided by the embodiment, the problem is solved that the display panel displays nonuniform due to the fact that the AMOLED initial display is not uniform, and the system does not need to modify the internal circuit of the display panel.

Figure 8:
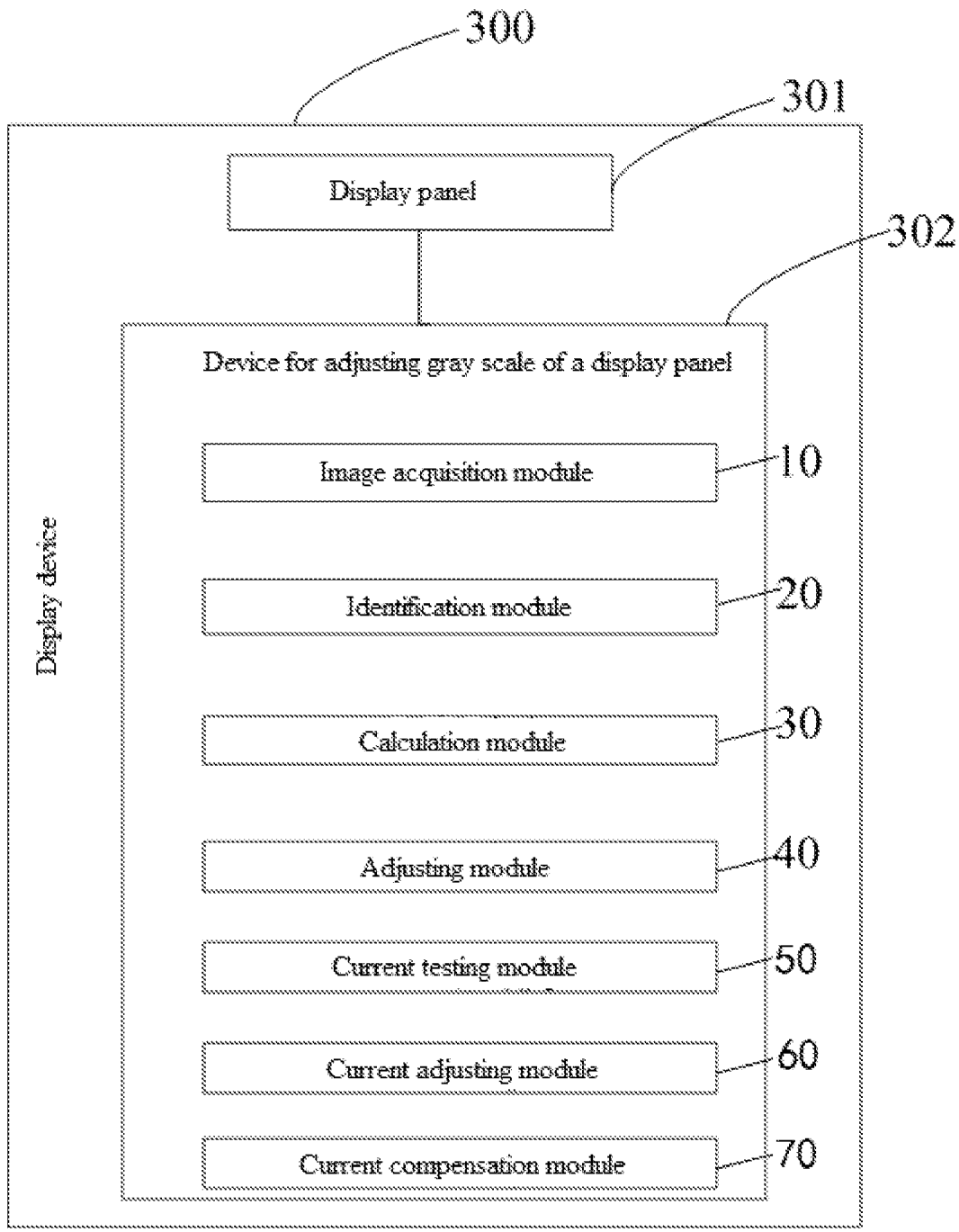
FIG. 8 is a schematic block diagram of a display device according to an embodiment of the present disclosure.

Referring to FIG. 8, a schematic block diagram of a display device is also provided according to an embodiment of the present disclosure, as shown in the drawing, the display device 300 can include a display panel 301 and the device 302 for adjusting gray scale of the display panel, wherein the device 302 for adjusting gray scale of the display panel includes:

an image acquisition module 10, configured to perform image acquisition on a display panel, and obtain a current image;

an identification module 20, configured to identify an nonuniform block in the current image, and detect an original output brightness and an original input gray scale of the nonuniform block;

a calculation module 30, configured to determine a target input gray scale corresponding to a preset target brightness according to an actual Gamma curve value, the actual Gamma curve value is obtained through testing the display panel;

an adjusting module 40, configured to use a difference value between the original input gray scale and the target input gray scale as a gray scale compensation value of the nonuniform block;

a current testing module 50, configured to test an actual current value of a sub-pixel on the display panel at an $i^{th}$ gray scale, wherein i=0, 1, 2, ..., n-1, and n is a gray scale grade value;

a current adjusting module 60, configured to adjust the actual current value of the sub-pixel at the $i^{th}$ gray scale to be a preset target current value of the sub-pixel at the $i^{th}$ gray scale, and record a target gray scale value when the sub-pixel is with a target current value corresponding to the $i^{th}$ gray scale;

a current compensation module 70, configured to perform current compensation on at least one sub-pixel to be compensated of the display panel, according to a data distribution table of target gray scale values of each said sub-pixel at each target current value.

It should be noted that the display panel in the embodiment can be a liquid crystal display panel, and the liquid crystal display panel can be applied to display devices such as a computer display screen, a television display screen, a tablet computer display screen and the like.

According to the embodiment, during the production wherein Manufacturing process of each piece of liquid crystal panel, gray scale value compensation is performed on the nonuniform region of the display panel, so that the most accurate compensation effect is achieved, and the nonuniform (mura) in the display panel can be accurately and effectively eliminated.

In addition, the embodiment of the present disclosure further provides a computer readable storage medium, and a program for adjusting gray scale of a display panel is stored on the computer readable storage medium, when program for adjusting gray scale of a display panel is executed by a processor, the following operations are realized:

performing image acquisition on a display panel, and obtaining a current image;

identifying an nonuniform block in the current image, and detecting an original output brightness and an original input gray scale of the nonuniform block;

determining a target input gray scale corresponding to a preset target brightness according to an actual Gamma curve value, the actual Gamma curve value is obtained through testing the display panel;

using a difference value between the original input gray scale and the target input gray scale as a gray scale compensation value of the nonuniform block;

testing an actual current value of a sub-pixel at an $i^{th}$ gray scale on the display panel, wherein i=0, 1, 2, ..., n-1, and n is a gray scale grade value;

adjusting the actual current value of the sub-pixel at the $i^{th}$ gray scale to be a preset target current value of the sub-pixel at the $i^{th}$ gray scale, and recording a target gray scale value when the sub-pixel is with a target current value corresponding to the $i^{th}$ gray scale;

performing current compensation on at least one sub-pixel to be compensated of the display panel, according to a data distribution table of target gray scale values of each said sub-pixel at each target current value.

Further, when the program for adjusting gray scale of a display panel is executed by the processor, the following operations are further realized:

obtaining n reference images of the display panel at different input gray scales, wherein n is an integer larger than or equal to 2;

calculating reference Gamma curve values of each of the reference images;

using an average value of the reference Gamma curve values as an actual Gamma curve value.

Further, when the program for adjusting gray scale of a display panel is executed by the processor, the following operations are further realized:

detecting a reference input gray scale and a reference output brightness of each reference image;

calculating a reference Gamma curve value of each reference image according to the reference input gray scale, the reference output brightness and a Gamma mathematical model; and the Gamma mathematical model represents the corresponding relation between the reference input gray scale and the reference output brightness.

Further, when the program for adjusting gray scale of a display panel is executed by the processor, the following operations are further realized:

obtaining an output brightness of a center point of the current image, and using the output brightness of the center point of the current image as the preset target brightness.

Further, when the program for adjusting gray scale of a display panel is executed by the processor, the following operations are further realized:

obtaining an output brightness of each pixel point at other regions except nonuniform regions in the current image;

calculating an average value of the output brightness of the pixel point, and using the average value of the output brightness as the preset target brightness.

Further, when the program for adjusting gray scale of a display panel is executed by the processor, the following operations are further realized:

transmitting a gray scale compensation value to the display panel, so that the display panel uses a result obtained after the gray scale compensation value adding the original input gray scale of the nonuniform block as a new input gray scale of the nonuniform block, so as to eliminate the nonuniform block in the current image.

Further, the method further includes burning the gray scale compensation value into a memory so as to achieve a compensation effect of the current image.

Further, the display panel is a liquid crystal display panel.

Further, the liquid crystal display panel can be applied to a computer display screen, a television display screen and a tablet computer display screen.

Further, the gray scale grade value n is n=2M, wherein M is a positive integer greater than or equal to 3.

Further, the step of testing an actual current value of a sub-pixel at an $i^{th}$ gray scale on the display panel includes: setting the gray scale of the sub-pixel on the display panel as 0, and testing to obtain a first output current value; adjusting the gray scale of the sub-pixel on the display panel to be i, and testing to obtain a second output current value; subtracting the first output current value from the second output current value to obtain the actual current value of the sub-pixel at the $i^{th}$ gray scale.

Further, the step of performing current compensation on at least one sub-pixel to be compensated of the display panel, according to a data distribution table of target gray scale values of each said sub-pixel at each target current value, wherein a specific process is as follows: for any sub-pixel of the display panel to be compensated, according to the data distribution table, adjusting a $j^{th}$ gray scale of the sub-pixel to a target gray scale value corresponding to a target current value of said sub-pixel at the $j^{th}$ gray scale, wherein j=1, 2, . . . , n−1.

According to the solution of the embodiments mentioned above, the images of the display panel at different gray scales are shot, and the reference Gamma curve values of the display panel at different gray scales are detected by combining the Gamma mathematical model. The average value of the reference Gamma curve values is used as the actual Gamma curve value closest to the actual condition of the display panel, the actual Gamma curve of the display panel can be effectively obtained in the process of producing the display panel, so that the gray scale compensation value of the nonuniform region can be obtained more accurately, and solves the problem that recently, in the process of manufacturing a liquid crystal display panel, due to the fact that a nonuniform compensation value is not accurate enough, the final effect of eliminating the nonuniform is undesirable. Meanwhile, through adjusting the actual current value obtained through testing of the sub-pixel at the $i^{th}$ gray scale to be a preset target current value of the sub-pixel at the $i^{th}$ gray scale, and recording a target gray scale value when the sub-pixel is with a target current value corresponding to the $i^{th}$ gray scale, and according to the target gray scale value distribution which is obtained when each sub-pixel is respectively with each target current value corresponding to n different gray scales, a data distribution table of the display panel is formed. Current compensation is performed on any other sub-pixel of the display panel according to the data distribution table. Therefore, the current of the whole display panel is uniformly distributed. Comparing with existing technical solutions, no special compensation circuit needs to be added, and the compensation effect is desirable. The compensation process is simple, and during long time operation, no new display nonuniform can be caused due to current distribution nonuniform.

It should be noted that in this document, the term "comprising", "comprises" or any other variation thereof is intended to encompass a non-exclusive inclusion, such that a process, a method, an article or a system which includes a series of elements not only includes those elements but also includes other elements which are not explicitly listed, or further includes elements inherent to the process, the method, the article or the system. Under the condition that no more limitation exists, the statement "comprises a . . . " defines an element, and it is not excluded that additional identical elements further exist in the process, the method, the article or the system which includes said element.

The serial numbers of the embodiments of the present disclosure are merely for description, and do not represent good or bad of the embodiments.

Through the description of the above embodiments, those skilled in the art can clearly understand that the method can be realized by means of software and necessary general hardware platforms, and it is also possible to be realized through hardware, but in many cases, the former is a preferred embodiment. On the basis of such understanding, the technical solutions of the present disclosure are essentially, or the part which makes contributions to the prior art, can be embodied in the form of a software product. The computer software product is stored in a computer readable storage medium (such as a ROM/RAM, a magnetic disk and an optical disk) as described above which comprises a plurality of instructions which are used for enabling a terminal device (which can be a mobile phone, a computer, a server, an air conditioner, or a network device and the like) executes the method according to various embodiments of the present disclosure.

The embodiments above are preferably embodiments of the present disclosure, and the present disclosure is not limited to such embodiments, equivalent structure or process modification based on the specification and the drawing of the present disclosure, or directly or indirectly used in other related technical field, both are similarly within the protection scope of the present disclosure.

What is claimed is:

1. A method for adjusting gray scale of a display panel, wherein the method comprises:
performing image acquisition on the display panel, and obtaining a current image;
identifying a nonuniform block in the current image, and detecting an original output brightness and an original input gray scale of the nonuniform block;
determining a target input gray scale corresponding to a preset target brightness according to an actual Gamma curve value, the actual Gamma curve value is obtained through testing the display panel;
using a difference value between the original input gray scale and the target input gray scale as a gray scale compensation value of the nonuniform block;
testing an actual current value of a sub-pixel at an ith gray scale on the display panel, wherein i=0, 1, 2, ..., n−1, and n is a gray scale grade value;
adjusting the actual current value of the sub-pixel at the ith gray scale to be a preset target current value of the sub-pixel at the ith gray scale, and recording a target gray scale value when the sub-pixel is at the preset target current value corresponding to the ith gray scale;
performing current compensation on at least one sub-pixel to be compensated of the display panel, according to a data distribution table of target gray scale values of each said sub-pixel at each target current value.

2. The method according to claim 1, wherein before the step of determining the target input gray scale corresponding to the preset target brightness according to the actual Gamma curve value, the method further comprises: obtaining n reference images of the display panel at different input gray scales, wherein n is an integer larger than or equal to 2;
calculating reference Gamma curve values of each of the reference images;
using an average value of the reference Gamma curve values as an actual Gamma curve value.

3. The method according to claim 2, wherein the step of calculating reference Gamma curve values of each of the reference images further comprises:
detecting a reference input gray scale and a reference output brightness of each reference image;
calculating a reference Gamma curve value of each reference image according to the reference input gray scale, the reference output brightness and a Gamma mathematical model; and the Gamma mathematical model represents the corresponding relation between the reference input gray scale and the reference output brightness.

4. The method according to claim 3, wherein the Gamma mathematical model is:

$$\frac{Tx - To}{T255 - To} = \left(\frac{Lx}{255}\right)^{Gamma}$$

wherein Tx is the reference output brightness, and T255 is a corresponding output brightness when an input gray scale is 255, To is a corresponding output brightness when an input gray scale is 0, Lx is the reference input gray scale, and Gamma is the actual Gamma curve value.

5. The method according to claim 2, wherein the n is an integer greater than or equal to 5.

6. The method according to claim 1, wherein before the step of determining the target input gray scale corresponding to the preset target brightness according to the actual Gamma curve value, the method further comprises:
obtaining an output brightness of a center point of the current image, and using the output brightness of the center point of the current image as the preset target brightness.

7. The method according to claim 1, wherein before the step of determining the target input gray scale corresponding to the preset target brightness according to the actual Gamma curve value, the method further comprises: obtaining an output brightness of each pixel point at other regions except nonuniform regions in the current image;
using an average value of the obtained output brightness as the preset target brightness.

8. The method according to claim 1, wherein after the step of using a difference value between the original input gray scale and the target input gray scale as a gray scale compensation value of the nonuniform block, the method further comprises:
transmitting a gray scale compensation value to the display panel, so that the display panel uses a result obtained after the gray scale compensation value adding the original input gray scale of the nonuniform block as a new input gray scale of the nonuniform block, so as to eliminate the nonuniform block in the current image.

9. The method according to claim 1, wherein the method further comprises:
burning the gray scale compensation value into a memory so as to achieve a compensation effect of the current image.

10. The method according to claim 1, wherein the display panel is a liquid crystal display panel.

11. The method according to claim 10, wherein the liquid crystal display panel is applied to a computer display screen, a television display screen and a tablet computer display screen.

12. The method according to claim 1, wherein the gray scale grade value n is n=2M, wherein M is a positive integer larger than or equal to 3.

13. The method according to claim 1, wherein the step of testing an actual current value of a sub-pixel at an $i^{th}$ gray scale on the display panel comprises:
setting the gray scale of the sub-pixel on the display panel as 0, and testing to obtain a first output current value;
adjusting the gray scale of the sub-pixel on the display panel to be i, and testing to obtain a second output current value;
subtracting the first output current value from the second output current value to obtain the actual current value of the sub-pixel at the $i^{th}$ gray scale.

14. The method according to claim 1, wherein the step of performing current compensation on at least one sub-pixel to be compensated of the display panel, according to a data distribution table of target gray scale values of each said sub-pixel at each target current value, wherein a specific process is as follows:
for any sub-pixel to be compensated of the display panel, according to the data distribution table, adjusting a jth gray scale of the sub-pixel to a target gray scale value corresponding to a target current value of said sub-pixel at the jth gray scale, wherein j=1, 2, . . . , n−1.

15. A device for adjusting gray scale of a display panel, wherein the device comprising:
an image acquisition module, configured to perform image acquisition on the display panel, and obtain a current image;
an identification module, configured to identify a nonuniform block in the current image, and detect an original output brightness and an original input gray scale of the nonuniform block;
a calculation module, configured to determine a target input gray scale corresponding to a preset target brightness according to an actual Gamma curve value, the actual Gamma curve value is obtained through testing the display panel;
an adjusting module, configured to use a difference value between the original input gray scale and the target input gray scale as a gray scale compensation value of the nonuniform block;
a current testing module, configured to test an actual current value of a sub-pixel at an ith gray scale on the display panel, wherein i=0, 1, 2, . . . , n−1, and n is a gray scale grade value;
a current adjusting module, configured to adjust the actual current value of the sub-pixel at the ith gray scale to be a preset target current value of the sub-pixel at the ith gray scale, and record a target gray scale value when the sub-pixel is at the preset target current value corresponding to the ith gray scale;
and a current compensation module, configured to perform current compensation on at least one sub-pixel to be compensated of the display panel, according to a data distribution table of target gray scale values of each said sub-pixel at each target current value.

16. The device for adjusting gray scale according to claim 15, wherein the image acquisition module is an optical CCD camera.

17. The device for adjusting gray scale according to claim 15, wherein the gray scale grade value n is n=2M, wherein M is a positive integer larger than or equal to 3.

18. The device for adjusting gray scale according to claim 15, wherein the current testing module comprises:
a setting gray scale unit, configured to set the gray scale of the sub-pixel on the display panel as 0, and test to obtain a first output current value;
an adjusting gray scale unit, configured to adjust the gray scale of the sub-pixel on the display panel to be i, and test to obtain a second output current value;
a testing actual current unit, configured to subtract the first output current value from the second output current value to obtain the actual current value of the sub-pixel at the $i^{th}$ gray scale.

19. The device for adjusting gray scale according to claim 15, wherein the current compensation module comprises:
an adjusting target gray scale unit, configured to for any sub-pixel to be compensated of the display panel, according to the data distribution table, adjust a $j^{th}$ gray scale of the sub-pixel to a target gray scale value corresponding to a target current value of said sub-pixel at the $j^{th}$ gray scale, wherein j=1, 2, . . . , n−1.

20. A display device, wherein the display device comprises: a display panel; and a device for adjusting gray scale of the display panel, the device for adjusting gray scale of the display panel comprises:
an image acquisition module, configured to perform image acquisition on the display panel, and obtain a current image;
an identification module, configured to identify a nonuniform block in the current image, and detect an original output brightness and an original input gray scale of the nonuniform block;
a calculation module, configured to determine a target input gray scale corresponding to a preset target brightness according to an actual Gamma curve value, the actual Gamma curve value is obtained through testing the display panel;
an adjusting module, configured to use a difference value between the original input gray scale and the target input gray scale as a gray scale compensation value of the nonuniform block;
a current testing module, configured to test an actual current value of a sub-pixel at an ith gray scale on the display panel, wherein i=0, 1, 2, . . . , n−1, and n is a gray scale grade value;
a current adjusting module, configured to adjust the actual current value of the sub-pixel at the ith gray scale to be a preset target current value of the sub-pixel at the ith gray scale, and record a target gray scale value when the sub-pixel is at the preset target current value corresponding to the ith gray scale;
and a current compensation module, configured to perform current compensation on at least one sub-pixel to be compensated of the display panel, according to a data distribution table of target gray scale values of each said sub-pixel at each target current value.

* * * * *